(12) United States Patent
Sekiya et al.

(10) Patent No.: US 10,527,330 B2
(45) Date of Patent: Jan. 7, 2020

(54) REFRIGERATION CYCLE DEVICE

(71) Applicant: Hitachi, Ltd., Chiyoda-ku, Tokyo (JP)

(72) Inventors: Sachio Sekiya, Tokyo (JP); Masanao Kotani, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 96 days.

(21) Appl. No.: 15/566,892

(22) PCT Filed: Apr. 13, 2016

(86) PCT No.: PCT/JP2016/061882
§ 371 (c)(1),
(2) Date: Oct. 16, 2017

(87) PCT Pub. No.: WO2016/171052
PCT Pub. Date: Oct. 27, 2016

(65) Prior Publication Data
US 2018/0100677 A1    Apr. 12, 2018

(30) Foreign Application Priority Data
Apr. 24, 2015  (JP) ................. 2015-089325

(51) Int. Cl.
*F25B 41/06* (2006.01)
*F25B 13/00* (2006.01)
(Continued)

(52) U.S. Cl.
CPC ........... *F25B 41/062* (2013.01); *F24F 11/65* (2018.01); *F24F 11/89* (2018.01); *F25B 13/00* (2013.01);
(Continued)

(58) Field of Classification Search
CPC .. F25B 41/06; F25B 13/00; F25B 2313/0314; F25B 2313/0315; F25B 2500/28;
(Continued)

(56) References Cited

U.S. PATENT DOCUMENTS 9,644,877 B2 *  5/2017  Aoyama ................. F25B 13/00
2015/0068238 A1 *  3/2015  Haikawa ................. F25B 13/00
62/222

FOREIGN PATENT DOCUMENTS

EP    2 581 689 A1    4/2013
JP    2002-327950 A    11/2002
(Continued)

OTHER PUBLICATIONS

International Search Report (PCT/ISA/210) issued in PCT Application No. PCT/JP2016/061882 dated Jul. 19, 2016 with English translation (Thirteen (13) pages).

*Primary Examiner* — Marc E Norman
(74) *Attorney, Agent, or Firm* — Crowell & Moring LLP

(57) ABSTRACT

In a refrigeration cycle device, a compressor, a heat exchanger serving as a condenser, an expansion valve, and a heat exchanger serving as an evaporator are connected in order through refrigerant piping to form a refrigeration cycle. The refrigeration cycle device includes an evaporation temperature sensor provided between the expansion valve and the exchanger serving as the evaporator. The opening degree of the expansion valve is controlled such that an evaporation temperature detected by the evaporation temperature sensor reaches a control target value of the evaporation value. As a result, the refrigeration cycle device capable of achieving enhanced controllability while preventing liquid back to the compressor is provided.

13 Claims, 6 Drawing Sheets

(51) Int. Cl.
*F24F 11/65* (2018.01)
*F24F 11/89* (2018.01)

(52) U.S. Cl.
CPC ............... *F25B 2313/0233* (2013.01); *F25B 2313/0314* (2013.01); *F25B 2313/0315* (2013.01); *F25B 2500/28* (2013.01); *F25B 2600/21* (2013.01); *F25B 2600/2513* (2013.01); *F25B 2700/21174* (2013.01); *F25B 2700/21175* (2013.01)

(58) Field of Classification Search
CPC .... F25B 2600/2513; F25B 2700/21174; F25B 41/062
See application file for complete search history.

(56) References Cited

FOREIGN PATENT DOCUMENTS

| | | |
|---|---|---|
| JP | 2004-225924 A | 8/2004 |
| JP | 2007-207154 A | 8/2007 |
| JP | 2007-324514 A | 12/2007 |
| JP | 2011-257100 A | 12/2011 |
| JP | 2012-167902 A | 9/2012 |
| JP | 2014-190557 A | 10/2014 |

* cited by examiner

REFRIGERATION CYCLE DEVICE

TECHNICAL FIELD

The present invention relates to a refrigeration cycle device such as of an air conditioner and the like.

BACKGROUND ART

An air conditioner is known in the related art, which ham a refrigeration cycle created by using refrigerant piping to connect an outdoor unit that includes a compressor, an outdoor heat exchanger, an outdoor fan and the like, to an indoor unit that includes an indoor heat exchanger and the like, in which cooling, heating and/or the like are provided through the indoor unit. If the compressor used in such an air conditioner sucks a large amount of liquid refrigerant, the compressor may possibly suffer a breakdown. Therefore, to avoid liquid back to the compressor, the opening control of an expansion valve (e.g., an electronic expansion valve) installed in the refrigeration cycle is important.

In techniques known as the opening control of the expansion valve, the discharge temperature of the compressor is controlled to reach a predetermined value, and/or, the degree of refrigerant superheat at the outlet of the heat exchanger which is an evaporator is controlled to reach a predetermined value.

Techniques disclosed in the Japanese Patent Application Laid-Open No. 2004-225924 (Patent Literature 1) include: the control of expansion means such that the degree of superheat at the outlet of the heat exchanger which is an evaporator is set at zero and also the degree of refrigerant dryness becomes one; the control of expansion means such that an evaporation temperature is obtained by conversion from low pressure and the evaporation temperature is caused to approach a target evaporation temperature; the control of expansion means such that the degree of refrigerant superheat at the outlet of the compressor falls within a predetermined range; and/or the like.

Further, a control method is disclosed in the Japanese Patent Application Laid-Open No. 2002-327950 (Patent Literature 2), in which, for control of the opening degree of an indoor expansion valve such that the degree of refrigerant superheat at the evaporator outlet reaches a desired value and for control of the capacity of the compressor such that the evaporation temperature of the refrigerant in the evaporator reaches a target temperature, a dynamic model is used to improve the mutual destabilizing influence of the controls on the evaporation temperatures in both the controls.

CITATION LIST

Patent Literature

PTL 1: Japanese Patent Application Laid-Open No. 2004-225924
PTL 2: Japanese Patent Application Laid-Open No. 2002-327950

SUMMARY OF INVENTION

Technical Problem

The following are problems in the above patent literature 1.

Operating the compressor raises the temperature of the compressed refrigerant to a high temperature, so that the compressor housing containing a compression mechanism, a motor and the like, is heated. The housing is also heated by loss such as mechanical loss in the compression mechanism and/or the like being turned into heat. The heating energy is high when the air conditioning load is relatively high and the compressor rotating speed is high, but when the air conditioning load is relatively low, the amount of heat produced is smaller.

Meanwhile, the heat capacity of the compressor is not changed, so that, when the air conditioning load is low, the change in temperature of the compressor becomes slow. Because of this, when the air conditioning load is low, a delay in changing of discharge temperature as compared with the change in opening degree of the expansion valve is pronounced. As a result, the control of the expansion means based on the discharge temperature of the compressor has a problem of deteriorated controllability.

The prevention of liquid back to the compressor is important for the securing of reliability of the air conditioner. However, such deterioration of controllability may possibly cause occurrence of liquid back and/or the like, depending on conditions. In particular, the change in discharge temperature becomes slow under low load as described above. Because of this, there is a problem of impossibility of securing sufficient reliability.

Patent Literature 1 also discloses that an evaporation temperature of a refrigerant is obtained by conversion from low pressure in the refrigeration cycle and the evaporation temperature is controlled to approach a target evaporation temperature. A change in evaporation temperature is insensitive to the heat capacity of the compressor, thus being relatively fast. However, in the case of conversion from low pressure to evaporation temperature, an issue arises on estimate accuracy of evaporation temperature.

Specifically, the low pressure around an inlet of the compressor differs from an evaporation pressure in the indoor unit by a pressure loss in accordance with connection piping (refrigerant piping) from the indoor unit to the compressor, which is thus required to be corrected for proper recognition of the evaporation temperature.

The pressure loss varies not only depending on installation condition such as the length of piping and the like but also depending on the capability of the air conditioner, that is, the flow rate of a refrigerant flowing through the connection piping. As a result, it is difficult to detect a correct value of a pressure loss.

Accordingly, it is difficult to estimate the evaporation temperature with high accuracy, and moreover, since Patent Literature 1 performs the control using a slowly changing discharge temperature of the compressor, it is difficult to implement control with fast response and high accuracy. In other words, there is no due consideration to improvement in controllability while preventing liquid back to a compressor.

Meanwhile, Patent Literature 2 has the following problems.

As described in Patent Literature 2, controlling the degree of refrigerant superheat at the evaporator outlet is not affected by the heat capacity of the compressor, so that responsivity is fast, and even if the air conditioning load is relatively low, the control is facilitated. However, when the refrigerant at the evaporator outlet does not completely gasify, that is, flows out in the gas-liquid two phase state, a problem arises in which, irrespective of the ratio of liquid, a value of the degree of refrigerant superheat becomes zero. In this event, the evaporation temperature is required to be reduced by narrowing the expansion valve so that the refrigerant evaporates completely, but the ratio of liquid is not able to be detected. Therefore, it cannot be determined how far the expansion valve is to be narrowed.

Further, the refrigerant, even after having evaporated, increases in temperature by heat exchange with air. However, since the amount of temperature rise is smaller as air temperature is low, there is a problem of the difficulty of also determining to what degree the expansion valve is to be opened when the degree of superheat is large.

Therefore, even under condition that the degree of superheat deviates significantly from a target value and/or a transient change is large such as during startup of the air conditioner and the like, the opening degree of the expansion valve is controlled to be increased little by little, causing a problem of low response and a reduction in controllability.

Further, in Patent Literature 2, since the degree of superheat is detected by a low pressure sensor and an suction temperature sensor which are installed on the inlet side of the compressor, as in the case of the above Patent Literature 1, an exact detection of a pressure loss value is difficult, causing a problem of the difficulty of estimating the degree of refrigerant superheat at the evaporator outlet with high accuracy.

That is, in Patent Literature 2, it is also difficult to implement control with fast response and high accuracy, and there is no due consideration to improvement in controllability while preventing liquid back to a compressor.

An object of the present invention is to provide a refrigeration cycle device capable of achieving improved controllability while preventing liquid back to a compressor.

Solution to Problem

To attain this object, the present invention provides a refrigeration cycle device, in which a compressor, a heat exchanger serving as a condenser, an expansion valve, and a heat exchanger serving as an evaporator are connected in order through refrigerant piping to form a refrigeration cycle. The refrigeration cycle device includes an evaporation temperature sensor placed between the expansion valve and the heat exchanger serving as the evaporator. The opening degree of the expansion valve is controlled in accordance with a temperature detected by the evaporation temperature sensor.

Advantageous Effects of Invention

According to the present invention, an advantageous effect of obtaining a refrigeration cycle device capable of increasing the controllability while preventing liquid back to a compressor can be produced.

DESCRIPTION OF EMBODIMENT

Specific embodiments of a refrigeration cycle device in accordance with the present invention will now be described with reference the drawings. Throughout the drawings, the elements indicated by the same reference signs refer to the same elements or equivalent elements.

First Embodiment

Figure 1:
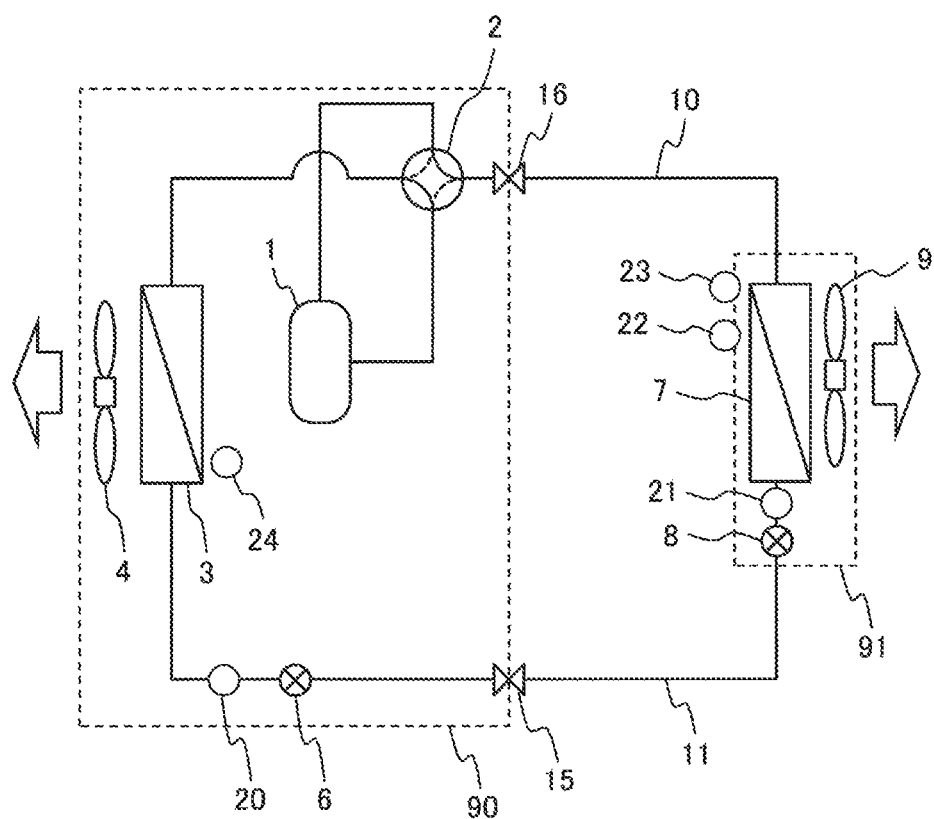
FIG. 1 is a refrigeration cycle block diagram illustrating a first embodiment of a refrigeration cycle device in accordance with the present invention.

A first embodiment of a refrigeration cycle device in accordance with the present invention will be described with reference to FIG. 1 to FIG. 4. In the first embodiment, an example where the present invention is applied to an air conditioner as a refrigeration cycle device is described. FIG. 1 is a cycle schematic diagram of a refrigeration cycle device in accordance with the embodiment.

In FIG. 1, reference sign 90 denotes an outdoor unit and reference sign 91 denotes an indoor unit.

The outdoor unit 90 includes: a compressor 1 for compressing a refrigerant; a four-way valve 2 for redirecting the flow of refrigerant depending on the cooling operation and the heating operation; an outdoor heat exchanger (heat exchanger) 3 for exchanging heat between a refrigerant and outdoor air (outside atmosphere); an outdoor fan 4 for blowing outdoor air into the outdoor heat exchanger 3; an outdoor expansion valve (expansion valve) 6; and the like. The outdoor unit 90 is also equipped with an evaporation temperature sensor 20 between the outdoor expansion valve 6 and the outdoor heat exchanger 3 in order to detect a temperature (temperature of refrigerant piping) at an outlet of the indoor expansion valve 6 during heating operation. The outdoor unit 90 further equipped with an outdoor-air temperature sensor 24 to detect a temperature of outdoor air sucked into the outdoor heat exchanger 3.

The indoor unit 91 includes: an indoor heat exchanger (heat exchanger) 7; an indoor expansion valve (expansion valve) 8; an indoor fan 9 for blowing indoor air into the indoor heat exchanger 7; and the like, and is equipped with an evaporation temperature sensor 21 between the indoor expansion valve 8 and the indoor heat exchanger 7 to detect a temperature at an outlet of the indoor expansion valve 8 during cooling operation. The indoor unit 91 also equipped with a suction temperature sensor 22 to detect a temperature of sucked air, and a humidity sensor 23 to detect a humidity.

The outdoor unit 90 and the indoor unit 91 are connected by gas connection piping (refrigerant piping) 10 through which a gas refrigerant flows, and liquid connection piping (refrigerant piping) 11 through which a liquid refrigerant flows. Note that the outdoor unit 90 is equipped with a liquid stop valve 15 in a portion connected to the liquid connection piping 11, and a gas stop valve 16 in a portion connected to the gas connection piping 12.

In cooling operation, a gas refrigerant, which is compressed to a high temperature and pressure in the compressor 1, passes through the four-way valve 2 along a circuit shown by a solid line, followed by being fed into the outdoor heat exchanger 3. In the outdoor heat exchanger 3, the high temperature, high pressure gas refrigerant exchanges heat with outdoor air fed by the outdoor fan 4 for heat dissipation, which thereby condenses/liquefies to a liquid refrigerant. The liquid refrigerant flows through the liquid connection piping 11 to enter the indoor unit 91, in which the liquid refrigerant is decompressed to a predetermined pressure by the indoor expansion valve 8, turning the refrigerant into a low temperature, low pressure refrigerant which then flows into the indoor heat exchanger 7. In the indoor heat exchanger 7, the refrigerant exchanges heat with indoor air fed by the indoor fan 9 to remove heat from the indoor air for cooling, as a result of which the refrigerant itself evaporate to gas. Then, the gas refrigerant flows back to the outdoor unit 90 through the gas connection piping 10, which then is sucked into the compressor 1 via the four-way valve 2. During cooling operation, such a refrigeration cycle is repeated.

Figure 9:
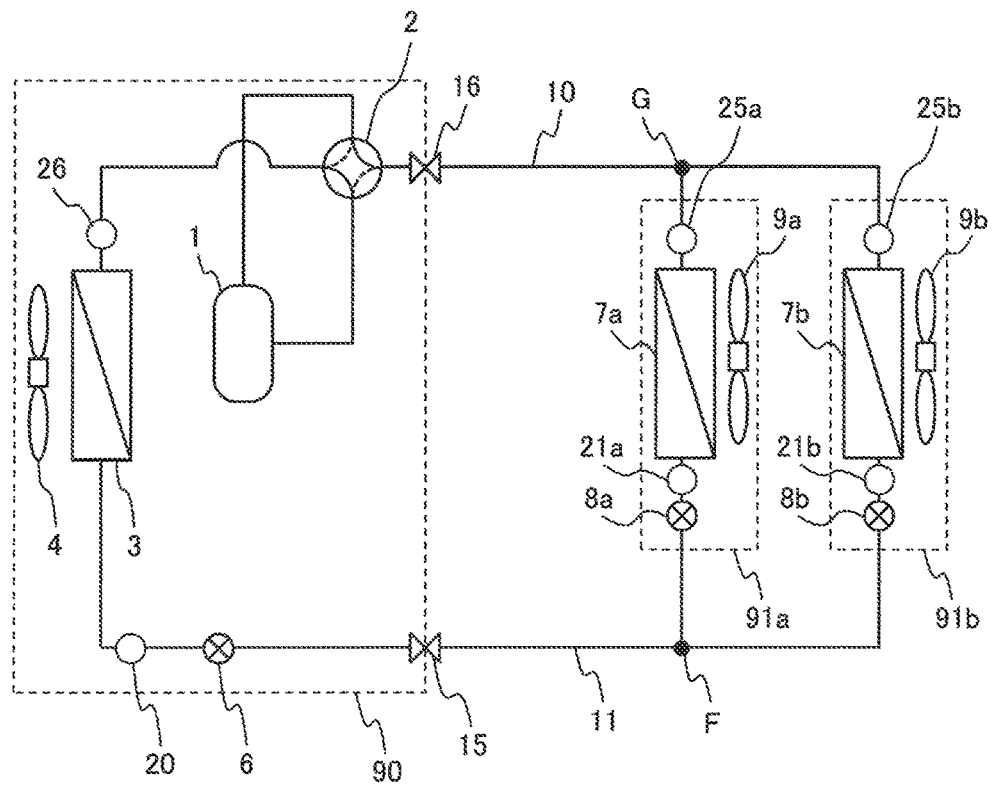
FIG. 9 is a refrigeration cycle block diagram illustrating a fourth embodiment of a refrigeration cycle device in accordance with the present invention.

Note that only one indoor unit 91 is shown in the example illustrated in FIG. 1, but, as illustrated in FIG. 9 described later, indoor units 91 may be often provided in plural and in parallel. In this case, in addition to the decompression of the refrigerant, the indoor expansion valve 8 performs the action that adjusts the flow rate of the refrigerant flowing in each indoor unit 91.

During heating operation, the four-way valve 2 is switched to the circuit indicated by the dashed line for the operation. A high temperature, high pressure gas refrigerant discharged from the compressor 1 flows into the indoor unit 91 through the four-way valve 2 and the gas connection piping 10, then exchanges heat with indoor air in the indoor exchanger 7 for heat dissipation, as a result of which the refrigerant heats the indoor air and also itself condenses to liquid. The liquid refrigerant thus liquefied flows back to the outdoor unit 90 through the liquid connection piping 11, which then is decompressed by the outdoor expansion valve 6 to be a low temperature, low pressure refrigerant. The low temperature, low pressure refrigerant then exchanges heat with outdoor air blown by the outdoor fan, in the outdoor heat exchanger 3, and then removes heat from the outdoor air and evaporates, which then is sucked into the compressor 1 via the four-way valve 2. During heating operation, such refrigeration cycle is repeated.

Figure 2:
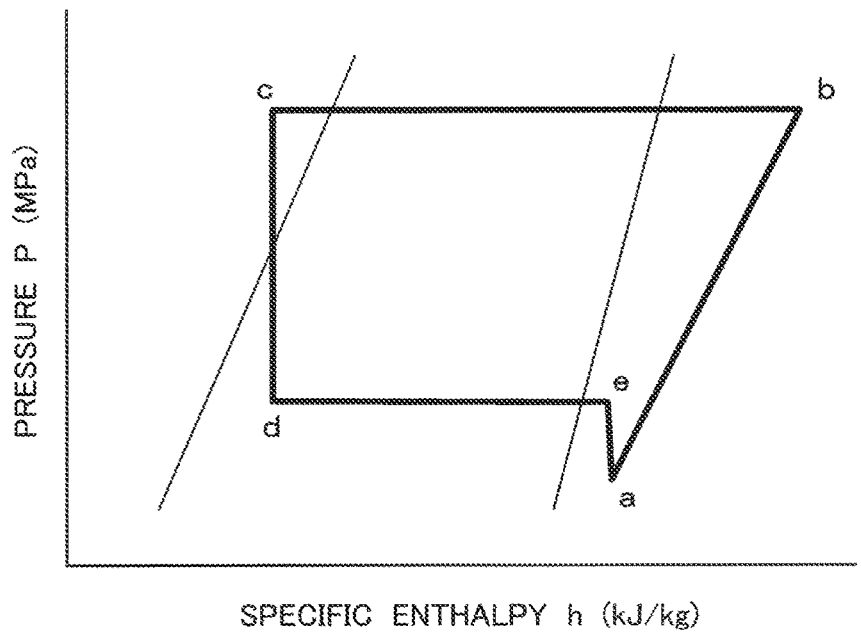
FIG. 2 is an example of P-h diagram during cooling operation of the refrigeration cycle device.

FIG. 2 is an example of P-h diagram during cooling operation of the refrigeration cycle device, in which the horizontal axis represents specific enthalpy h (kJ/kg), while the vertical axis represents pressure P (MPa). The refrigerant sucked into the compressor 1 is compressed from state a to state b, which is turned into a high temperature, high pressure refrigerant. Subsequently, the refrigerant condensing in the outdoor heat exchanger 3 enters state c, which then is decompressed in the indoor expansion valve 6 to enter state d. The refrigerant after decompression absorbs heat in the indoor heat exchanger 7 and evaporates to enter state e. Then, while passing through the connection piping and/or the like from the indoor unit 91 to the outdoor unit 90, the refrigerant is decompressed by the refrigerant flow pressure loss to return to state a.

Figure 3:
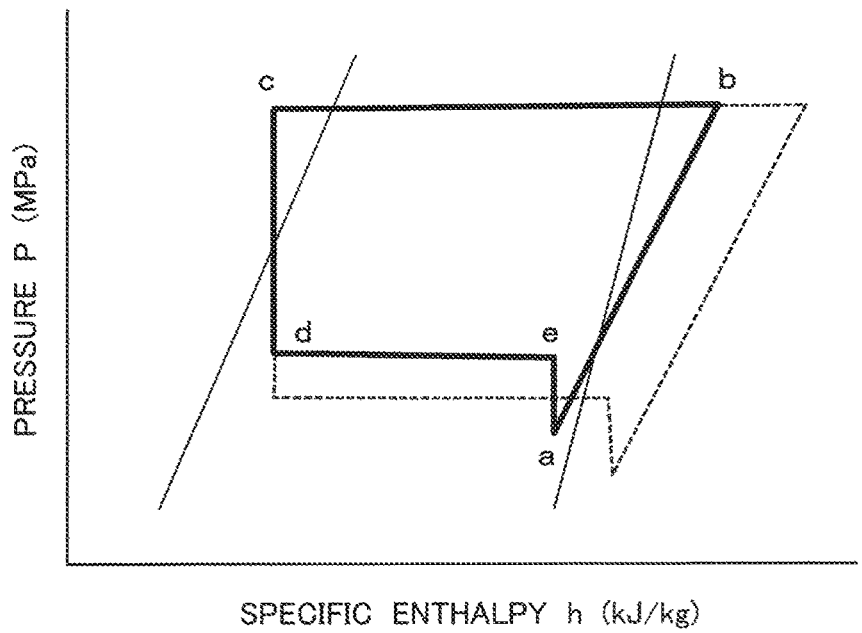
FIG. 3 is another example of P-h diagram during cooling operation of the refrigeration cycle device, which is the diagram showing the case of an insufficient amount of decompression in an expansion vale.

FIG. 3 is another example of P-h diagram during cooling operation of the refrigeration cycle device, which is the diagram showing the case of an insufficient amount of decompression in an expansion valve (e.g., the indoor expansion valve 8). In FIG. 3, the dashed lines show the state shown in FIG. 2. Since an insufficient amount of decompression in the indoor expansion valve 8 causes a rise in evaporation temperature, as the temperature difference from indoor air is smaller, the exchange heat quantity decreases. Because of this, the refrigerant is not able to be superheated at the outlet of the indoor heat exchanger 7, as a result of which the refrigerant containing liquid phase (liquid refrigerant) flows back to the compressor 1.

Since the compressor 1 is incapable of compressing a liquid refrigerant, return of a large amount of liquid refrigerant to the compressor 1 may possibly cause a malfunction of the compressor 1. Therefore, properly controlling the amount of decompression in the indoor expansion valve 8 is very important in preventing liquid back to a compressor to secure reliability.

In contrast, an excessive amount of decompression in the indoor expansion valve 8 increases the degree of superheat at the outlet of the indoor heat exchanger 7 serving as the evaporator, leading to a rise in temperature of the refrigerant sucked into the compressor. Further, since the suction pressure decreases, a further rise in theoretical discharge temperature of the compressor 1 which is determined by refrigerant physical properties occurs.

Since the discharge temperature of the compressor 1 is increased by these factors, the temperature of the compressor 1 may be excessively increased depending on condition, possibly causing loss of the reliability.

Since the refrigerant, after having been turned into a superheated gas within the indoor heat exchanger 7 has a low performance for heat transfer to/from air, a wider superheated gas region causes a problem of a degradation of the heat transfer performance (heat exchange efficiency) as the heat exchanger. Accordingly, the efficiency as the air conditioner is also decreased. As a result, an excessive amount of decompression in the indoor expansion S is also undesired.

As described above, not only in terms of securing of the reliability in the compressor 1, but also in terms of the efficiency as the air conditioner, it is important to control the opening degree of the indoor expansion valve 8 in a proper manner to maintain an approximate degree of superheat at the evaporator outlet. The discharge temperature of the compressor 1 has the property of decreasing when the amount of decompression is insufficient and liquid back occurs, but, on the other hand, of increasing when the amount of decompression is excessive. Because of this, the reliability can be secured to some extent by properly maintaining the discharge temperature of the compressor 1.

However, a change in the discharge temperature of the compressor 1 becomes slow by the heat capacity of the compressor 1 as compared with a change in state of the refrigerant. Therefore, there is a problem of a poor followability (low control response) to follow a sharp change of refrigerant state. The problem becomes pronounced particularly under conditions that the compressor rotating speed is low and a thermal loss in the compression 1 is decreased, and therefore time is required until the discharge temperature is affected by changes of rotating speed of the compressor 1, the opening degree of the indoor expansion valve 8 and/or the like.

Therefore, assuming that since, for example, the discharge temperature is higher than a target, the opening degree of the indoor expansion valve 8 is increased. Even if the opening degree of the indoor expansion valve 8 is increased, the discharge temperature is slow to decrease, so that the opening degree of the indoor expansion valve 8 is excessively increased. As a result, a situation in which liquid back to the compressor 1 occurs may possibly occur. In this manner, in the control for properly maintaining the discharge temperature of the compressor 1, there is a possibility that the controllability worsens to impair the reliability of the air conditioner.

Further, if the connection piping (refrigerant piping) 10, 11 between the outdoor unit 90 and the indoor unit 91 is long in length, the heat capacity of the connection piping 10, 11 significantly affects, resulting in a longer time required until the discharge temperature of the compressor is affected by a change of the opening degree of the indoor expansion valve 8. Because of this, the controllability further worsens.

The following is a description of an embodiment of the present invention to resolve the above problems. In the embodiment, a evaporation temperature sensor 21 detecting an evaporation temperature is installed on the refrigerant piping between the expansion valve outlet and the heat exchanger serving as the evaporator, more specifically, between the indoor expansion valve 8 and the indoor heat exchanger 7 serving as the evaporator during cooling operation, and the indoor expansion valve 8 is controlled such that a detected temperature of the sensor 21 reaches a control target value.

The outlet of the indoor expansion valve 8 is a location where the temperature changes initially when the opening degree of the indoor expansion valve 8 is changed or the rotating speed of the compressor 1 is changed, offering a feature of a fast response to a change in control state. In the embodiment, the evaporation temperature sensor 21 is placed at the outlet of the indoor expansion valve 8 and a temperature detected by the evaporation temperature sensor 21 (evaporation temperature) is used to control the indoor expansion valve 8. Therefore, a change of the evaporator state in response to the change in control state can be detected rapidly to control the expansion valve 8. Further, in the embodiment, the evaporation temperature is detected directly by the evaporation temperature sensor 21, and therefore there is no risk of occurrence of an error in an estimation of the evaporation temperature due to a pressure loss in the gas connection piping 10 as happens in conventional manners.

Therefore, according to the embodiment, the controllability such as of the control of the opening degree of the indoor expansion valve 8 can be improved, resulting in prevention of liquid back to the compressor 1 to increase the reliability. Further, in the embodiment, not only the control involving fast response is enabled, but also an evaporation temperature is able to be detected with high accuracy, and thus the degree of superheat at the evaporator outlet is capable of being controlled with high accuracy. This enables the degree of superheat to be easily controlled to a proper degree, which in turn achieving enhanced heat exchange efficiency in the air conditioner. As a result, according to the embodiment, it is possible to provide an air conditioner with improved controllability and satisfactory efficiency while preventing liquid back to the compressor.

In particular, in the embodiment, since the heat capacity of the compressor 1 and the gas connection piping 10, a pressure loss in the gas connection piping 10, and/or the like have no effect, a rapid detection of the evaporation temperature with high accuracy is made possible even on condition that the air conditioning load is low and rotating speed of the compressor 1 is low, leading to an enhancement in controllability. As a result, it is also made possible to expand the controllable capability range of the air conditioner toward low load.

During low load of the air conditioner, if the compressor rotating speed is reduced to lower the capability of the air conditioner while the degree of superheat in the evaporator is maintained constant, the suction pressure of the compressor may increase and therefore a differential pressure or a pressure ratio required by the compressor may possibly not be ensured. Not reducing the compressor rotating speed causes an excessive capability for air conditioning. Because of this, the compressor is required to be intermittently operated, resulting in the energy efficiency suffering.

In contrast to this, in the embodiment, since expansion of the controllable capability range of the air conditioner toward low load is enabled, the intermittent operation of the compressor during the low load condition can be inhibited and consequently an increase in power consumption associated with the intermittent operation of the compressor can be inhibited. Accordingly, in this respect, it is also possible to provide an air conditioner with low power consumption and high efficiency.

Further, in a conventional method in which low pressure on the suction side of the compressor is used to estimate an evaporation temperature, when a plurality of the indoor units 91 is arranged in parallel, the state of each of the indoor units 91 cannot be detected. In contrast to this, in the embodiment, even when a plurality of the indoor units 91 is arranged in parallel, a change in evaporation temperature of each of the indoor units 91 can be correctly detected, thus producing an advantageous effect of enabling appropriate control to a change in each indoor unit.

Figure 4:
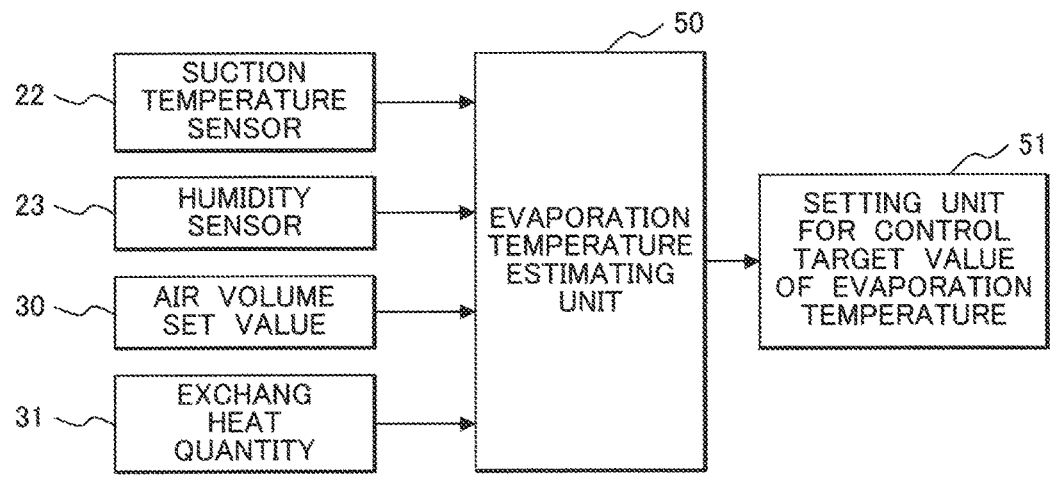
FIG. 4 is a block diagram illustrating a method of setting a control target value of evaporation temperature in the refrigeration cycle device in accordance with the first embodiment.

Next, setting of control target values for evaporation temperature in the refrigeration cycle device in accordance with the embodiment will be described with reference to FIG. 4. FIG. 4 is a block diagram describing the method of setting a control target value of the evaporation temperature in accordance with the first embodiment.

Various methods may be used to determine a control target value of the evaporation temperature. In the embodiment, as shown in FIG. 4, an evaporation temperature estimating unit 50 is provided. A temperature of air sucked into the indoor heat exchanger 7 is detected by the suction temperature sensor 22 and a humidity is detected the humidity sensor 23. The evaporation temperature estimating unit 50 estimates an evaporation temperature from the above values, a volume of air flowing into the indoor heat exchanger 7 provided by the air volume set value 30, and the exchange heat quantity 31. Here, the exchange heat quantity 31 of the indoor heat exchanger 7 is estimated from the evaporation temperature detected by the evaporation temperature 21, the rotating speed of the compressor 1, and/or the like. Further, the air volume set value 30 is a set value of the volume of air fed into the indoor heat exchanger 7 by the indoor fan 9.

Note that information from the humidity sensor 23 shown in FIG. 4 is not necessarily needed. For example, a humidity may be estimated for use instead of using a detected value from the humidity sensor 23. Further, the rotating speed of the indoor fan 9 may be used for the air volume set value 30.

Further, a setting unit 51 for control target values of evaporation temperature is provided that sets a control target value of evaporation temperature using the evaporation temperature estimated by the evaporation temperature estimating unit 50. The functions of the evaporation temperature estimating unit 30 and the evaporation-temperature control target value setting unit 51 may be implemented in a control device (not shown) provide in the air conditioner and/or the like. The control target values for the evaporation temperature set by the evaporation temperature estimating unit 50 and the evaporation-temperature control target value setting unit 51 are preferably designed to be modified at each predetermined control cycle.

The indoor expansion valve 8 is controlled by the control device such that the temperature detected by the evaporation temperature sensor 21 reaches a control target value of evaporation temperature set by the evaporation-temperature control target value setting unit 51. In the embodiment, the control target value of evaporation temperature can be included as an absolute value. Because of this, for example, even in the event of an excessive degree of superheat or occurrence of liquid back, the opening degree of the indoor expansion valve 8 is able to be controlled such that the value of the evaporation temperature sensor 21 installed at the outlet of the indoor expansion valve 8 reaches the control target value of the evaporation temperature.

For example, during startup of the air conditioner, if the indoor expansion valve 8 is slightly narrowed in order to prevent liquid back, the evaporation pressure excessively drops to cause difficulty in full use of the cooling capability of the air conditioner, so that the cooling capability is lowered. Lower cooling capability slows the rate of rise in discharge temperature of the compressor 1, requiring time.

For this reason, in conventional control of an outdoor expansion valve by use of a discharge temperature, time is required until the operation of increasing the opening degree of the indoor expansion valve is performed, so that the low cooling capability condition continues a while, resulting in the cooling capability being easily lacked during startup.

Further, in conventional control of an indoor expansion valve such that the degree of refrigerant superheat at an evaporator outlet reaches a desired value, during startup of the air conditioner, when the indoor expansion valve is slightly narrowed, the degree of superheat at the evaporator outlet is relatively early ensured and increased. However, it is difficult to determine how far the indoor expansion valve may be opened in order for the degree of superheat to reach a suitable value in the next time. Therefore, in order to prevent liquid back to secure the reliability, there is no other way but to open the indoor expansion valve little by little over time.

In the conventional control, as described above, there is an issue of difficulty in full use of the cooling capability of the air conditioner.

In contrast to this, in the embodiment, the control target value of evaporation temperature is included as an absolute value and the indoor expansion valve 8 is controlled such that the temperature detected by the evaporation temperature sensor 21 reaches the control target value. Because of this, the indoor expansion valve 8 can be held at a proper opening degree, without being moved to an excessive small or large opening degree.

Further, even if the indoor expansion valve 8 is too narrowed, it is possible to know a deviation between the detected temperature of the evaporation temperature sensor 21 and the control target value of the evaporation temperature, which in turn makes it possible to determine to what degree the opening of the indoor expansion valve 8 is to be changed. As a result, the evaporation pressure can be prevented from excessively dropping during startup of the air conditioner to lack the cooling capability, and it is possible to shorten the time period until full use of the cooling capability can be made. As a result, the comfort of the air conditioner can be improved.

Further, in the event of a sudden pressure change in the indoor heat exchanger 7 serving as the evaporator, the opening degree of the indoor expansion valve 8 may be excessively narrowed and/or liquid back to the compressor may possibly occur. In a conventional control using a discharge temperature and/or the degree of superheat, however, it may possibly not be determined what degree of opening of the indoor expansion valve is to be change.

In contrast to this, in the embodiment, the control target value of evaporation temperature is included as an absolute value, and therefore a deviation between the detected temperature of the evaporation temperature sensor 21 and the control target value can be detected, which in turn makes it possible to estimate a required amount of change in the opening degree of the indoor expansion valve 8 even when liquid back to the compressor occurs and/or the degree of superheat is excessive. As a result, the reliability of the air conditioner can be increased.

Figure 5A:
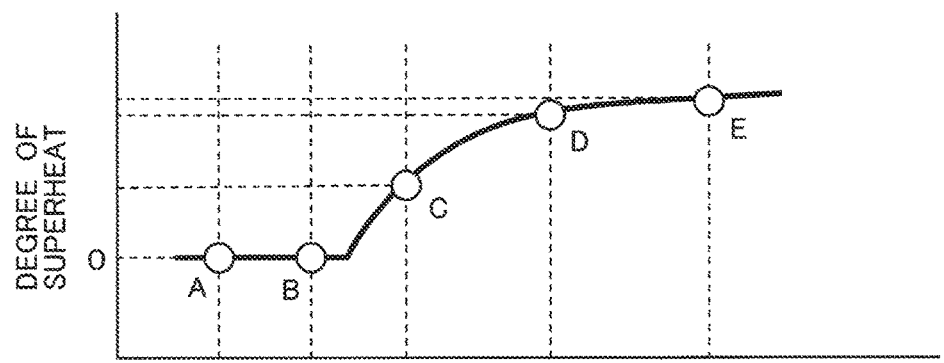
FIGS. 5A and 5B are diagrams illustrating the effects in the embodiment, which is a diagram showing the relationship among the opening degree of the expansion valve, the degree of superheat, and the evaporation temperature.

The above will be described using a specific example with reference to FIG. 5. FIG. 5 is a diagram illustrating the effects in the embodiment, which is a diagram showing the relationship among the opening degree of the expansion valve, the degree of superheat, and the evaporation temperature.

In a conventional example in which the degree of refrigerant superheat at the evaporator outlet is controlled, as shown in FIG. 5($a$), the degree of refrigerant superheat takes a value of zero in both cases of a higher ratio of liquid (the case of point A) and a lower ratio of liquid (the case of point B) when the refrigerant in the evaporator outlet does not gasify completely (if the refrigerant flows out in gas liquid two phase state). In this case, the expansion valve is required to be narrowed to decrease the evaporation temperature so that the refrigerant completely evaporates, but since the ratio of liquid is not able to be detected, it cannot determine to what degree the expansion valve is to be narrowed.

Further, the refrigerant after evaporation also increases in temperature through heat exchange with air, but as the air temperature is low, the amount of temperature rise is smaller. Because of this, when the degree of superheat is large (the cases of points D, E), it also is difficult to determine to what degree the expansion valve is to be opened.

Specifically, assuming that the opening degree of the expansion valve is proper at point C. Since the degrees of superheat at point A and point B are equally zero degrees, if looking at only the degree of superheat, when the opening degree of the expansion valve is changed to point C, it is difficult to determine what degree of opening is to be narrowed.

When the expansion valve is too narrowed, the evaporation temperature decreases in accordance with the opening degree of the expansion valve. However, since the degrees of superheat at point D and point E are approximately equal, for control to point C, it is difficult to determine to what degree the expansion valve is to be opened.

On this account, a conventional control in which the degree of refrigerant superheat at the evaporator outlet is controlled has a disadvantage that a delay in control is produced by changing the opening degree little by little for safety reasons.

Figure 5B:
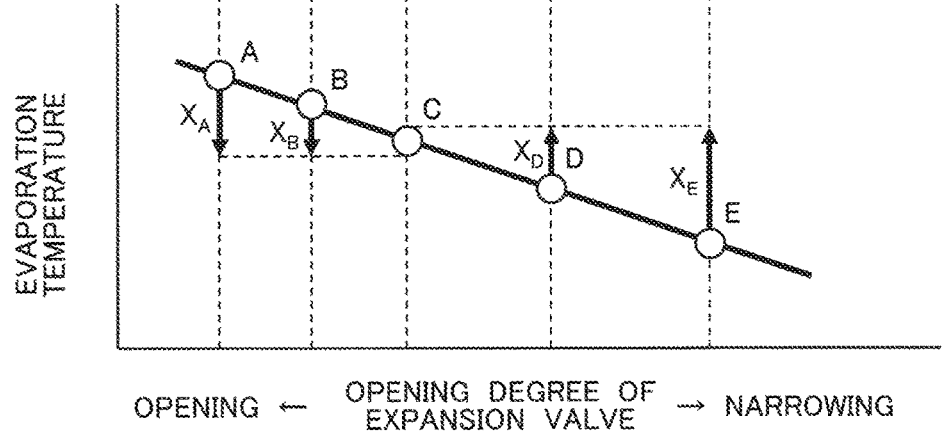

In contrast to this, in the embodiment, the evaporation temperature sensor 21 is placed between the indoor expansion valve 8 and the indoor heat exchanger 7 serving as the evaporator, and the indoor expansion valve 8 is controlled such that the detected temperature of the sensor 21 reaches the control target value. Because of this, as shown in FIG. 5(b), the size of the difference between the control target value of the evaporation temperature (point C) and the detected evaporation temperature is made clear, which facilitates determining to what degree the expansion valve is to be narrowed or opened.

Specifically, the degrees of superheat at point A and point B are equally zero degrees, but, when looking at the evaporation temperature, a difference between the evaporation temperature at point A and the control target value at point C is different from that between the evaporation temperature at point B and the control target value at point C. Because of this, in accordance with the individual differences, adjusting the amount of narrowing as shown by $X_A$, $X_B$ enables proper and speedy correction of the opening degree of the expansion valve.

When the expansion valve is too narrowed, the degrees of superheat at point D and point E are approximately equal to each other, but since the evaporation temperature decreases in accordance with the opening degree of the expansion valve, the evaporation temperatures at point D and point E are extremely different from each other. Accordingly, again, in accordance with each difference from the control target value (point C), adjusting the amount of opening as shown by $X_D$, $X_E$ enables proper and speedy correction of the opening degree of the expansion valve. As a result, according to the embodiment, since a proper opening-degree controlled variable of the expansion valve is able to be obtained, the evaporation temperature is capable of being speedily and properly controlled to approach the control target value, providing a refrigeration cycle device with satisfactory controllability.

As a result, even under condition that the degree of superheat deviates significantly from a target value and/or a transient change is large such as during startup of the air conditioner and the like, the opening degree of the expansion valve can be speedily and precisely controlled, and thus control fast response can be achieved, enabling improved controllability.

Meanwhile, in the refrigeration cycle device, typically, as the air conditioning load, that is, the exchange heat quantity is smaller, the temperature difference between the refrigerant and the indoor air in the indoor unit 91 is smaller, so that the evaporation temperature is higher. Thereby, the suction pressure of the compressor 1 is higher, and in turn the difference between the suction pressure and the discharge pressure is smaller, thus raising the possibility of deviation from the operable range of the compressor 1. Therefore, an excessive rise in the evaporation temperature is not desired in terms of securing of the reliability of the compressor 1.

To address this, in the embodiment, an upper limit is set to the control target value of the evaporation temperature. In the outlet of the indoor expansion valve 8, the refrigerant is in the gas liquid two phase state, and a saturation pressure is determined in accordance with the refrigerant temperature. Therefore, the evaporation pressure is not raised beyond the saturation pressure of the evaporation temperature, a limit can be imposed on the evaporation pressure by setting an upper limit value to the control target value of the evaporation temperature.

The suction pressure of the compressor 1 is decreased by a pressure loss in the gas connection piping 10. Therefore, by imposing a limit on the evaporation pressure, the suction pressure of the compressor 1 can be maintained in a state reliably lower than the evaporation pressure in the indoor heat exchanger 7 serving as the evaporator. Accordingly, since a rise in the suction pressure is prevented, the reliability of the compressor 1 can be secured.

Note that it is conceivable that the rotating speed of the compressor 1 is increased, that is, the cooling capability is increased to prevent a rise in the suction pressure of the compressor 1. This, however, makes the cooling capability excessive relative to the air conditioning load, and therefore the compressor 1 is intermittently operated, leading to an increase in power consumption. In contrast to this, in the embodiment, since a rise in the suction pressure is inhibited without an increase in the rotating speed of the compressor 1, the intermittent operation of the compressor 1 is inhibited, so that the compressor 1 is capable of being continuously operated, and therefore an increase in power consumption is inhibited, thus providing a high energy efficiency air conditioner.

Although the above description a description on the operation during cooling operation, the present invention may be similarly implemented for the operation during heating operation. This is described using FIG. 1. During heating operation, the four-way valve 2 is switched to flow the refrigerant toward the dashed line. A high temperature, high pressure gas refrigerant discharged from the compressor 1 flows into the indoor heat exchanger 7, where it condenses to a liquid refrigerant which then flows through the liquid connection piping 11 into the outdoor unit 90.

At this stage, the indoor expansion valve 8 is fully opened, and the refrigerant is decompressed in the outdoor expansion valve 6.

Further, the evaporation temperature sensor 20 is installed on the refrigerant piping between the outdoor expansion valve 6 and the outdoor heat exchanger 3. The opening degree of the outdoor expansion valve 6 is controlled such that an evaporation temperature detected by the evaporation temperature sensor 20 reaches a predetermined temperature (control target value). During heating operation, the control target value of the evaporation temperature is contained as an absolute value, thereby stably controlling the outdoor expansion valve 6. This enables operation with liquid back to the compressor 1 being prevented, and increased reliability can be achieved.

Even under condition that the evaporation pressure is easily raised such as when outdoor-air temperature is high and/or the like, by setting an upper limit value to the control target value of the evaporation temperature, a limit is imposed on the evaporation pressure. Therefore, an excessive rise in suction pressure of the compressor can be prevented, as a result of which the reliability of the compressor 1 can be secured to increase the reliability as an air conditioner.

Second Embodiment

Figure 6:
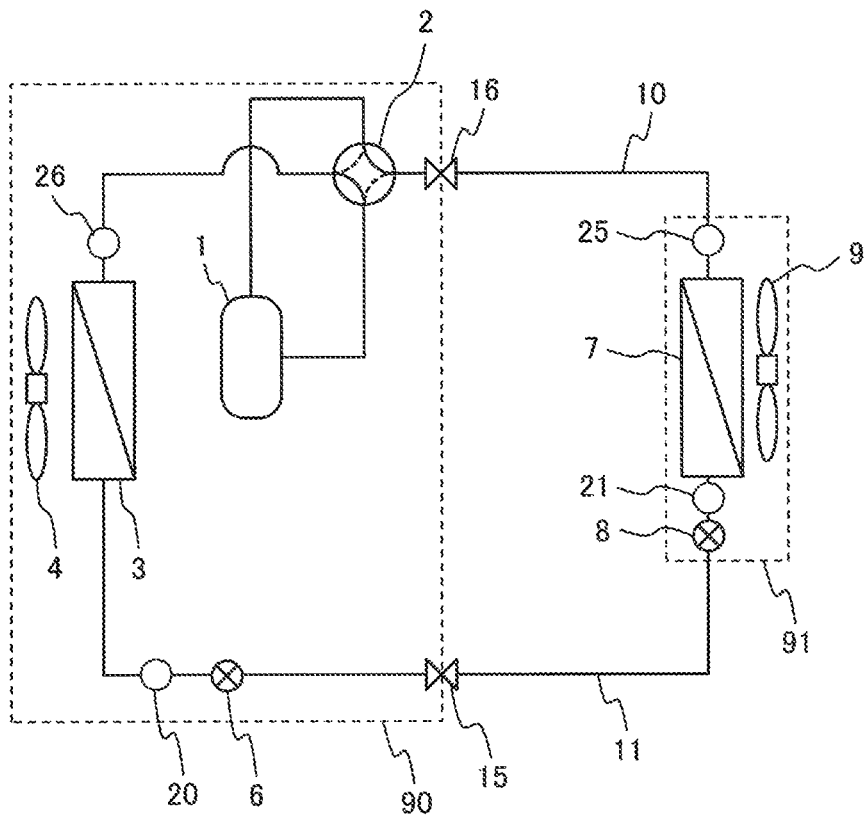
FIG. 6 is a refrigeration cycle block diagram illustrating a second embodiment of a refrigeration cycle device in accordance with the present invention.
Figure 7:
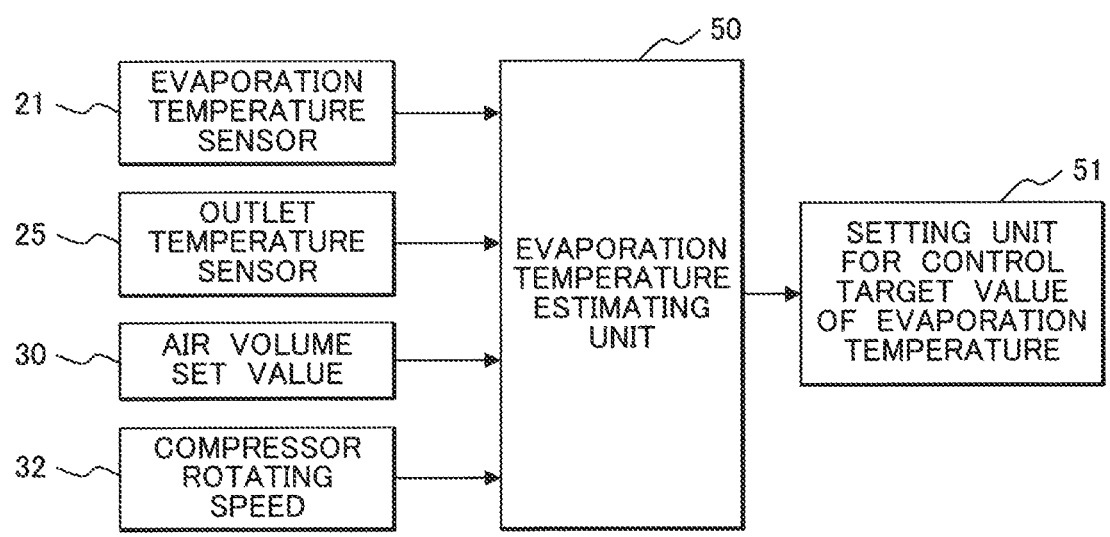
FIG. 7 is a block diagram illustrating a method of setting a control target value of evaporation temperature in the refrigeration cycle device in accordance with the second embodiment.

Next, a second embodiment in accordance with the present invention will be described with reference to FIG. 6 and FIG. 7. FIG. 6 is a refrigeration cycle block diagram illustrating the second embodiment of a refrigeration cycle device in accordance with the present invention. FIG. 7 is a block diagram illustrating a method of setting a control target value of evaporation temperature in the refrigeration cycle device in accordance with the second embodiment.

In FIG. 6 and FIG. 7, the elements indicated by same reference signs as those in FIG. 1 and FIG. 4 refer to the same elements or equivalent elements, and points differing from FIG. 1 are mainly described. The second embodiment differs from the first embodiment in that an outlet temperature 25 is installed on the opposite side of the indoor heat exchanger 7 from the indoor expansion valve 8 in the indoor unit 91, and further, an outlet temperature 26 is installed on the opposite side of the outdoor heat exchanger 3 from the outdoor expansion valve 6 in the outdoor unit 90. Note that the suction temperature sensor 22 and the humidity sensor 23 in the first embodiment are not provided in the second embodiment, but, as in the case of the first embodiment, these sensors 22, 23 may be provided to perform the control similar to the first embodiment.

As in the case of the first embodiment, in the second embodiment, during cooling operation, the opening degree of the indoor expansion valve 8 is controlled such that a temperature detected by the evaporation temperature sensor 21 reaches a target temperature (a control target value of the evaporation temperature). Here, unlike the first embodiment, the control target value of the evaporation temperature is not fixed and the control target value of the evaporation temperature is modified in a sequential manner such that a difference between an evaporator outlet temperature detected by the outlet temperature sensor 25 placed at the outlet of the indoor heat exchanger 7 and an evaporation temperature detected by the evaporation temperature sensor 21 reaches a desired value. The control target value of the evaporation temperature is modified at each predetermined control cycle.

Since a difference between the evaporator outlet temperature and the evaporation temperature corresponds to the degree of superheat at the evaporator outlet, the evaporation temperature is modified sequentially such that the degree of superheat reaches a desired value. By sequentially modifying the control target value of the evaporation temperature in accordance with the degree of superheat, even if an error is caused in the evaporation temperature estimated by the evaporation temperature estimating unit 50 shown in FIG. 7, not only the reliability of the compressor 1 can be increased, but also efficient operation of the air conditioner is enabled by ensuring the degree of superheat at the outlet of the indoor heat exchanger 7 serving as the evaporator.

The advantageous effects produced by keeping the degree of superheat at the evaporator outlet are similar to those in conventional superheat-degree control. In addition, in the second embodiment, an absolute value of the evaporation temperature is used as a control target value. Because of this, even if the degree of superheat is excessive or becomes zero, as in the case of the first embodiment, a deviation between the control target value and an evaporation temperature detected by the evaporation temperature sensor 21 can be obtained. Therefore, a controlled variable for the opening degree of the expansion valve is identified, which represents what degree of opening of the indoor expansion valve 8 is to be changed. As a result, stable control can be implemented.

Meanwhile, the temperature detected by the outlet temperature sensor 25 is stable when the degree of superheat is sufficiently high, but the temperature varies when the degree of superheat is low. This is because, when the degree of superheat at the heat exchanger outlet is sufficiently high, the refrigerant evaporates completely into gas to thereby make temperature stable, however, when the degree of superheat is low, there are alternate occurrences of the conditions of the refrigerant evaporating completely to cause a rise in temperature and the conditions of the mixing of a low-temperature liquid phase refrigerant failing to evaporate, and temperature varies in response to this action.

In the temperature variations, a wide range of variation is of the order of 5° C. depending on condition, but it is difficult to determine from only information on the degree of superheat whether a cause of temperature changes results from the influence of a change in operation condition or the influence of such variations. In this case, it is conceivable that the expansion valve is to controlled to be narrowed to keep a high degree of superheat in order to secure reliability. However, when the degree of superheat is controlled to be higher, effective use of the entire heat transfer area of the heat exchanger is made impossible, resulting in a reduction in heat transfer performance leading to an increase in power consumption of the air conditioner.

In contrast to this, in the embodiment, since the opening degree of the indoor expansion valve 8 is controlled such that the temperature detected by the evaporation temperature sensor 21 reaches the target temperature, even when the evaporator outlet temperature varies due to a low degree of superheat, the evaporation temperature is stable at the inlet of the evaporator, making it possible to circumvent disadvantages such as a false detection of temperature caused by temperature variations at the evaporator outlet and/or the like. Accordingly, advantageous effects of implementing stable control without being affected by a false detection are produced.

Further, when the cycle is relatively stable without a change in operation state of subassemblies such as the compressor 1, the outdoor fan 4 and the like, a proper evaporation temperature is stable. Because of this, even if the degree of superheat at the evaporator outlet (or outlet temperature) varies, a change in control target value of the evaporation temperature may be small. Therefore, even under condition that the degree of superheat is relatively low and the degree of superheat varies, a variation in evaporation temperature which is to be a control target value is small, facilitating the control. Because of this, it is possible to inhibit the performance of the heat exchange from being reduced by increasing the degree of superheat, thus achieving efficient operation with a low degree of superheat. That is, according to the embodiment, an effective air conditioner with low power consumption can be provided.

Further, setting an upper limit value and a lower limit value to the control target value of the evaporation temperature enables the evaporation pressure to be prevented from being extremely raised or decreased, and therefore the reliability of the compressor 1 is secured. Note that the upper limit value and the lower limit value for the control target value of the evaporation temperature may be set in accordance with the temperature of air flowing into the heat exchanger 7 serving as the evaporator, and the control target value may be changed in accordance with the volume of air, a humidity and/or the like. For example, in the case of a low air volume, the evaporation temperature becomes low, so that the lower limit value may be lowered.

Meanwhile, when the air conditioning load suddenly varies and the rotating speed of the compressor 1 also varies, the evaporation temperature also changes quickly. If the target value of the evaporation temperature is not changed, the degree of superheat at the evaporator outlet may be excessive and/or liquid back may possibly occur. In contrast to this, in the embodiment, as shown in FIG. 7, the evaporation temperature estimating unit 50 has the function of modifying the control target value 51 of the evaporation temperature in accordance with the amount of even when the air conditioning load varies, the control target value 51 of the evaporation temperature can be optimized and the opening degree of the indoor expansion valve 8 can be controlled toward the optimized control target value. Because of this, it is possible to circumvent disadvantages that the degree of superheat is excessive and/or liquid back occurs.

Further, the evaporation temperature also change quickly when the air volume of the indoor fan 9 is changed, such as when a user changes an air volume set value 30 of the indoor unit 91 during cooling operation, and/or the like. Therefore, in the embodiment, the evaporation temperature estimating unit 50 has the function of estimating a change in evaporation temperature when the air volume set value 30 is changed. Hence, as in the case of changes of the air conditioning load, pre-changing the control target value of the evaporation temperature makes it possible to circumvent disadvantages that the degree of superheat is excessive and/or liquid back occurs.

Incidentally, a discharge temperature sensor (not shown) for detecting a discharge temperature may be installed either on discharge piping of the compressor or in a gastight enclosure of the compressor in order to detect a discharge temperature and discharge temperature control may be performed to control the discharge temperature to reach a target value. In the case of performing this control, the degree of superheat at the evaporator outlet can be relatively easily controlled to be lower. In contrast to this, in the superheat-degree control using evaporation temperature, it is impossible to set a target degree of superheat to zero, creating a need to keep the target degree of superheat at a high degree to some extent. A higher degree of superheat causes a wide superheated gas region to be formed around the outlet of the heat exchanger serving as the evaporator. The heat transfer performance in the superheated gas region is degraded as compared with the heat transfer performance in a two phase region, so that the heat transfer performance of the entire heat exchanger is degraded. Accordingly, for effective operation of the air conditioner, the aforementioned discharge temperature control is preferable to the superheat-degree control.

However, when the discharge temperature control is performed in low load range, a change in discharge temperature is slower to degrade the controllability. Therefore, in the low load range, the superheat-degree control using the evaporation temperature is more efficient.

Therefore, in the embodiment, in the low load range, evaporation temperature control to cause the evaporation temperature to reach the control target value is employed. On the other hand, in a high load range in which the rotating speed of the compressor is high, the switch to the discharge temperature control in which the discharge temperature is controlled to reach the target value is made for operation. That is, a control device (not shown) is included, that has the evaporation temperature control function of controlling the opening degree of the indoor expansion valve 8 such that the evaporation temperature detected by the evaporation temperature sensor 21 reaches the control target value of the evaporation temperature. In addition to this, the control device further has the discharge temperature control function of controlling the discharge temperature of the compressor to reach the target value. The control device performs switching control to select the evaporation temperature control function for operation in the low load range, and select the discharge temperature control function for operation in the high load range. The control device may also be included in the control device controlling the air conditioner.

Accordingly, in the high load range, by the discharge temperature control, the operation at high energy efficiency while the discharge temperature is maintained properly can be implemented. Meanwhile, in the low load range, by the evaporation temperature control, the indoor expansion valve 8 is controlled such that the evaporation temperature becomes proper in order to implement stable and responsive expansion-valve control, and thereby the compressor 1 is continuously operated, thus implementing a high energy efficient air conditioner. As a result, an air conditioner with less power consumption throughout one year is provided, and in particular, since higher energy efficiency performance can be achieved in the high load range, the advantageous effect of reducing the peak power consumption can be produced.

Note that, in the second embodiment, the switching to the discharge temperature control is configured to be made for operation in the high load range. However, if the evaporation temperature control may be continued in the high load range and, instead of this, in the high load range, the discharge temperature may be used to calculate the control target value of the evaporation temperature, the same disadvantage effects can be produced.

Further, in the second embodiment, as in the case of the first embodiment, the above-described control can be performed similarly during heating operation. That is, during heating operation, while the control target value of the evaporation temperature is modified sequentially such that a difference between the evaporation temperature sensor 20 and the outlet temperature sensor 26 which are installed in the outdoor unit 90 reaches a predetermined temperature, the opening degree of the outdoor expansion valve 6 is controlled such that the evaporation temperature detected by the evaporation temperature sensor 20 reaches the control target value. By controlling the opening degree of the outdoor expansion valve 6 using the control target value (absolute value) of the evaporation temperature rather than using the degree of superheat, the same advantageous effects as those in the cooling operation are produced.

Third Embodiment

Figure 8:
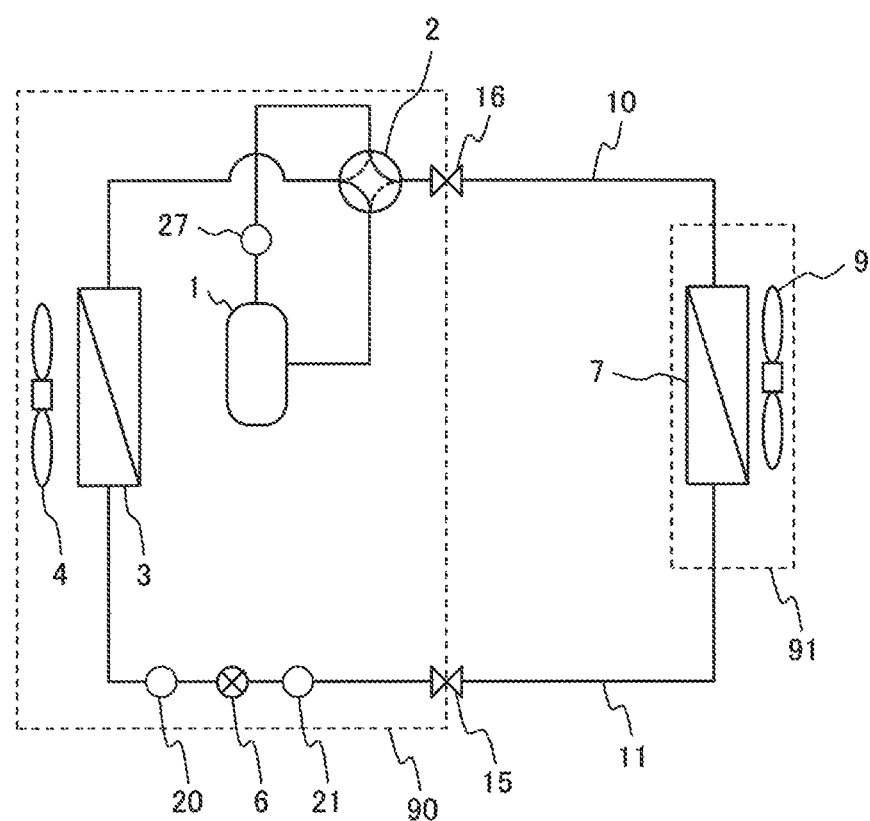
FIG. 8 is a refrigeration cycle block diagram illustrating a third embodiment of a refrigeration cycle device in accordance with the present invention.

A third embodiment in accordance with the present invention will be described with reference to FIG. 8. FIG. 8 is a refrigeration cycle block diagram illustrating the third embodiment of a refrigeration cycle device in accordance with the present invention. In FIG. 8, the elements indicated by the same reference signs as those in FIG. 1 and FIG. 6 refer to the same elements or equivalent elements, and points differing from FIG. 1 and FIG. 6 are mainly described.

In the third embodiment, an expansion valve (the indoor expansion valve 8 shown in FIG. 1 and FIG. 6) is not mounted in the indoor unit 91. During cooling operation, the outer expansion valve 6 is also used for decompression as in the case of the heating operation. Further, in the embodiment, a suction temperature sensor 27 is installed on the suction piping of the compressor 1, and thereby the suction temperature sensor 27 is used for the outlet temperature of the evaporator outlet both during cooling operation and during heating operation, thereby eliminating the need for the outlet temperature sensors 25, 26 shown in FIG. 6. Further, the evaporation temperature sensor 21, which is placed in the indoor unit 91 in the above first, second embodiments, is placed on the same side of the outdoor expansion valve 6 in the outdoor unit 90 as the indoor heat exchanger 7. The third embodiment differs in these aspects from the first, second embodiments.

In the embodiment, during cooling operation, the control target value of the evaporation temperature is modified sequentially such that a difference between the suction temperature sensor 27 and the evaporation temperature sensor 21 reaches a predetermined value, and the outdoor expansion valve 6 is controlled such that the temperature detected by the evaporation temperature sensor 21 reaches the control target value. During heating operation, the control target value of the evaporation temperature is modified sequentially such that a difference between the suction temperature sensor 27 and the evaporation temperature sensor 20 reaches a predetermined value, and the outdoor expansion valve 6 is controlled such that the temperature detected by the evaporation temperature sensor 21 reaches the control target value.

In the third embodiment, by the configuration and the control as described above, approximately the same functions as those in the first, second embodiments can be provided and also the number of expansion valve and the number of outlet temperature sensors can be reduced. As a result, a cost reduction can be achieved. Also, a breakdown of equipment is difficult to be caused by a reduction in component count, thus providing an air conditioner with higher reliability.

Fourth Embodiment

Next, a fourth embodiment in accordance with the present invention will be described with reference to FIG. 9. FIG. 9 is a refrigeration cycle block diagram illustrating the fourth embodiment of a refrigeration cycle device in accordance with the present invention. In FIG. 9, the elements indicated by the same reference signs as those in FIG. 1 and FIG. 6 refer to the same elements or equivalent elements, and points differing from FIG. 1 and FIG. 6 are mainly described.

The fourth embodiment differs from the above embodiments in that the outdoor unit 90 is connected in parallel to a plurality of indoor units 91.

During cooling operation, after condensing in the outdoor heat exchanger 3, the refrigerant flows through the liquid connection piping 11, and then divides at a portion F and flows into the plurality of indoor units 91a, 91b which are connected in parallel. On the other ends of the respective indoor units 91a, 91b, the branched refrigerants meet again at a portion G, which then flows through the gas connection piping 10 back to the outside unit 90.

Here, for the refrigerants flowing into the respective indoor units 91a, 91b, the flow rate is distributed such that the pressure losses from the dividing portion F to the meeting portion G are equal to each other. In each of the indoor units 91a, 91b, an indoor expansion valve 8a, 8b is installed. An evaporation temperature sensor 21a, 21b is installed to detect a refrigerant temperature between the corresponding indoor expansion valve 8a, 8b and the corresponding indoor heat exchanger 7a, 7b. An outlet temperature sensor 25a, 25b is installed on the opposite side of the corresponding indoor heat exchanger 7a, 7b from the indoor expansion valve 8a, 8b in each indoor unit 91a, 91b. Reference signs 9a, 9b denote indoor fans mounted in the respective indoor units 91a, 91b.

As in conventional manners, in the case of estimating an evaporation temperature in each indoor heat exchanger 7a, 7b from the suction pressure of the compressor 1, the evaporation temperature in each of the indoor heat exchangers 7a, 7b is incapable of being individually detected. Because of this, it cannot be determined how each indoor expansion valve 8a, 8b should be controlled. In contrast to this, in the embodiment, the evaporation temperature sensor 21 is installed in each indoor unit 91a, 91b, so that an outlet temperature (evaporation temperature) of the indoor expansion valve 8a, 8b is able to be detected in each indoor unit 91a, 91b.

Therefore, as in the case of the embodiments 1 and 2, a control target value of an evaporation temperature is determined, and the opening degree of the indoor expansion valve 8 is controlled such that the control target value is reached. In the fourth embodiment, as in the case of the above embodiments, even if the degree of superheat at the evaporator outlet becomes zero and liquid back occurs, a deviation between the control target value of the evaporation temperature and the evaporation temperature sensor 21a, 21b is able to be detected. Because of this, the opening degree of each indoor expansion valve 8a, 8b may be changed in accordance with the deviation, providing an air conditioner with fast response and high controllability.

Further, if some of the plurality of the indoor units 91a, 91b, that is, the indoor unit 91a is in operation and the other indoor unit 91b is at standstill, when the indoor unit 91b commences operation from a standstill state, the number of indoor units in operation is changed from one to two. Under such transient condition, the degree of superheat in the indoor unit 91a continuously operated may be unstable, but the operational state of the indoor unit 91a is not changed basically. Because of this, there is no need to change the control target value of the evaporation temperature. Since the control target value of the evaporation temperature is given as an absolute value in this manner, even when the degree of superheat at the evaporator outlet transitionally varies, the stable control for the indoor expansion valve 8a can be implemented.

On the other hand, a control target value of the evaporation temperature in the indoor unit 91b which commences operation is required to be estimated because the indoor unit 91b has not been operated. In the fourth embodiment, the control target value of the evaporation temperature in the indoor unit 91a which is continuously operating is used to determine the control target value of the evaporation temperature in the indoor unit 91b which commences operation.

In the plurality of the indoor units 91a, 91b, the pressures at the meeting portion G on the outlet side of the indoor heat exchanger 7a, 7b are equal to each other, so that the evaporation temperatures in the indoor units 91a, 91b are equal to each other, except for the pressure loss in the piping from each indoor heat exchanger 7a, 7b to the meeting portion. Therefore, according to the embodiment in which the evaporation temperature of the indoor unit 91a continuously operating is used to determine the control target value of the evaporation temperature of the indoor unit 91b which commences operation, enabled is high-reliability control offering estimation of evaporation temperature with relatively high accuracy. The control as described in the fourth embodiment is effective particularly for the indoor units 91a and 91b being installed in the same air-conditioning space.

Further, after the room temperature falls and the indoor units 91a, 91b temporarily stop operation, when the room temperature increase and the indoor units at standstill commence operation again, information on the control target value of the evaporation temperature before coming to standstill may be held and the held control target value may be used again. In this case, the control target value of the evaporation temperature set in accordance with the circumstances of the space in which the indoor units 91a, 91b are mounted can be used, and therefore the estimation accuracy of the control target value is able to be increased. Accordingly, disadvantages such as liquid back and an excessive increase of the degree of superheat are able to be circumvented to provide an air conditioner with high reliability.

Such control in which information on before standstill is held is also effective for the situation in which the indoor units 91a and 91b are mounted in different air-conditioning spaces, as well as effective for the situation in which only one indoor unit is operated and also the situation in which only one indoor unit is connected as in the case of the first embodiment and/or the like.

Fifth Embodiment

Figure 10:
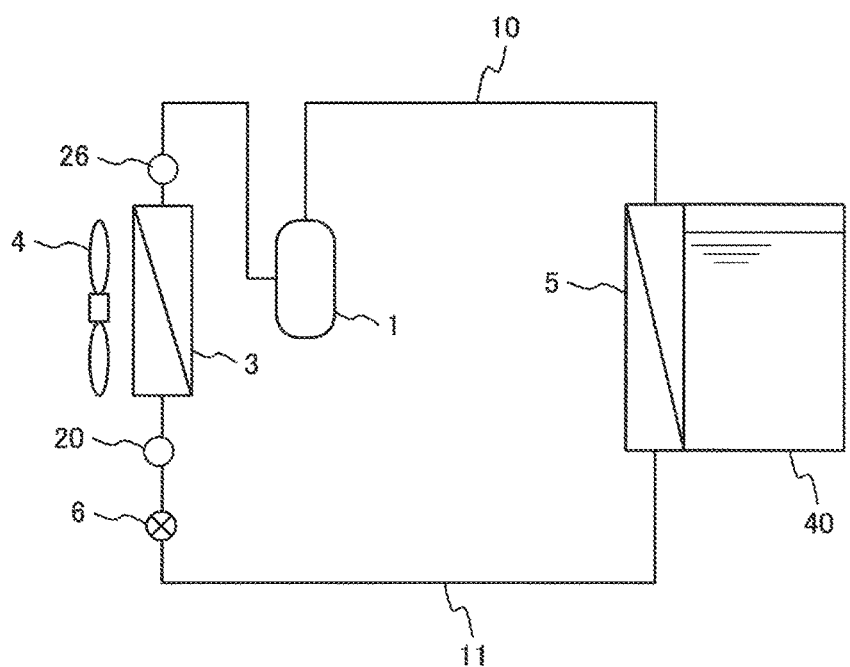
FIG. 10 is a refrigeration cycle block diagram illustrating a fifth embodiment of a refrigeration cycle device in accordance with the present invention.

A fifth embodiment in accordance with the present invention will be described with reference to FIG. 10. FIG. 10 is a refrigeration cycle block diagram illustrating the fifth embodiment of a refrigeration cycle device in accordance with the present invention. In FIG. 10, the elements indicated by the same reference signs as those in FIG. 1 and FIG. 6 refer to the same elements or equivalent elements, and points differing from FIG. 1 and FIG. 6 are mainly described.

The fifth embodiment is an example of applying the present invention to a heat-pump water heater. The present invention is applicable, not to an air conditioner, but to a water heater, a refrigerator and the like, as long as a refrigeration cycle device is used. With reference to FIG. 10, an embodiment of applying the present invention to a water heater as a refrigeration cycle device is described.

In FIG. 10, reference sign 40 denotes a water tank included in the water heater. The water contained in the water tank is heated by a water heat exchanger 5. The compressor 1, water heat exchanger 5, outdoor expansion valve 6 and the outdoor heat exchanger 3 are connected in a loop through the gas connection piping 10 and the liquid connection piping 11 to form a refrigeration cycle. The water heat exchanger 5 is configured to exchange heat between water in the water tank 40 and a high temperature, high pressure refrigerant which flows in the heat exchanger after being discharged from the compressor 1, in order to heat water in the water tank 40. The outdoor heat exchanger 3 is configured to exchange heat between outdoor air blown by the outdoor fan 4 and a low temperature, low pressure refrigerant which flows in the heat exchanger after being decompressed by the outdoor expansion valve 6.

For water heating operation, the high temperature, high pressure refrigerant compressed at the compressor 1 flows into the heat exchanger 5 and dissipates heat to water in the water tank to increase water temperature. The refrigerant condensing in the water heat exchanger 5 is decompressed by the expansion valve 6, after which the refrigerant evaporates in the outdoor heat exchanger into gas, which then flows back to the compressor 1 and then is compressed again.

During the water heating operation, the opening degree of the outdoor expansion valve 6 is adjusted such that an evaporation temperature, which is detected by the evaporation temperature sensor 20 placed between the outdoor expansion valve 6 and the outdoor heat exchanger 3, reaches a control target temperature. The control target value of the evaporation temperature is sequentially modified such that a difference between an outlet temperature of the outdoor heat exchanger (evaporator) 3 detected by the outlet temperature sensor 26 and the evaporation temperature detected by the evaporation temperature sensor 20 reaches a predetermined temperature difference.

In such a heat-pump water heater, under condition that the water heating load is low and the rotating speed of the compressor is low, a change in discharge temperature is slower to worsen the controllability. In contrast to this, in the fifth embodiment, the evaporation temperature detected by the evaporation temperature sensor 20 is used to control the opening degree of the outdoor expansion valve 6. Because of this, control with fast response is enabled, and even if the water heating load is low, stable control can be implemented.

Further, even under operation condition that the degree of superheat is low such that the temperature at the evaporator outlet detected by the outlet temperature sensor 26 varies, the evaporation temperature detected by the evaporation temperature sensor 20 does not vary.

Therefore, controlling the evaporation temperature detected by the evaporation temperature sensor 20 to reach the control target value enables stable control, and further, this enables a determination of a control target value of the evaporation by use of a smaller value of the degree of superheat, the smaller value being set than a conventional value when the degree of refrigerant superheat at the evaporator outlet is controlled. As a result, the heat transfer area of the outdoor heat exchanger 3 is effectively used to improve the heat transfer performance, thus providing a water heater with low power consumption.

In the embodiment, as in the case of each of the above embodiments, a proper opening-degree controlled variable for the expansion valve is also able to be obtained. Because of this, even at a large transient change, such as during startup, the control for the outdoor expansion valve 6 is optimized to inhibit excessive narrowing. Thereby, the water heating performance during startup can be increased and further the power consumption can be reduced.

Further, even when the water heating load varies, as in the case describe in FIG. 7, the control target value of the evaporation temperature is changed in accordance with a change in rotating speed of the compressor 1 which changes to follow load variations. As a result, the followability to follow load variation can be enhanced.

In this manner, in the fifth embodiment, during low load and in transition as well as normal operation, control with fast response and high stability can be implemented, resulting in a water heater (refrigeration cycle device) with high reliability being provided.

According to each of the above embodiments in accordance with the present invention, an evaporation temperature sensor is provided at an outlet of an expansion valve, and the opening degree of the expansion valve is controlled such that an evaporation temperature reaches a desired temperature (a control target value of the evaporation temperature). Because of this, the evaporation temperature control with high response is enabled to achieve a proper evaporation temperature. Therefore, while the degree of superheat is ensured with reliability to prevent liquid back to the compressor, the degree of superheat is able to be controlled properly to enhance the heat exchange efficiency. That is, according to the embodiment, it is possible to provide a refrigeration cycle device with high controllability capable of stable control with fast response while liquid back is prevented for an enhancement in reliability. Further, according to the embodiment, since controlling properly the degree of superheat to be proper with accuracy is enabled, the heat exchange efficiency is also enhanced, and further, an advantageous effect of stable control of the opening degree of the expansion valve being also enabled in a low load range is produced.

It is to be understood that the present invention is not limited to the above embodiments and various modifications are contained.

Further, some of the configuration of one embodiment may be substituted by the configuration of another embodiment, and the configuration of one embodiment may be added to the configuration of another embodiment.

Further, the foregoing embodiments have been described in detail for the purpose of explaining the present invention in an easy-to-understand manner, and the present invention is not limited necessarily to what includes all the configurations described herein.

REFERENCE SIGNS LIST

1: Compressor,
2: Four-way valve,
3: Outdoor heat exchanger (heat exchanger),
4: Outdoor fan,
5: Water heat exchanger,
6: Outdoor expansion valve (expansion valve),
7 (7a, 7b): Indoor heat exchanger (heat exchanger),
8 (8a, 8b): Indoor expansion valve (expansion valve),
9 (9a, 9b): Indoor fan,
10, 11: Refrigerant piping (10: gas connection piping, 11: liquid connection piping),
15: Liquid stop valve,
16: Gas stop valve,
20, 21: Evaporation temperature sensor,
22: Suction temperature sensor,
23: Humidity sensor,
24: Outdoor-air temperature sensor,
25 (25a, 25b), 26: Outlet temperature sensor,
27: Suction temperature sensor,
30: Air volume set value,
32: Compressor rotating speed,
40: Water tank,
50: Evaporation temperature estimating unit,
51: Evaporation-temperature control target value setting unit,
90: Outdoor unit,
91 (91a, 91b): Indoor unit.

The invention claimed is:

1. A refrigeration cycle device comprising:
a controller programmed to control operation of the refrigeration cycle device;
a compressor, a first heat exchanger serving as a condenser, an expansion valve, and a second heat exchanger serving as an evaporator connected in order through refrigerant piping to form a refrigeration cycle, and
an evaporation temperature sensor placed between the expansion valve and the second heat exchanger serving as the evaporator, wherein the opening degree of the expansion valve is controlled by the controller based on a temperature detected by the evaporation temperature sensor,
wherein the temperature detected by the evaporation temperature sensor is an evaporation temperature between the expansion valve and the second heat exchanger serving as the evaporator, and the opening degree of the expansion valve is controlled by the controller such that the evaporation temperature detected by the evaporation temperature sensor reaches the control target value of the evaporation temperature, and
wherein the controller is programmed to estimate the control target value of the evaporation temperature based on at least any of a temperature of sucked air sucked into the second heat exchanger serving as the evaporator, a humidity, the exchange heat quantity required of the second heat exchanger, and an air volume flowing into the second heat exchanger, wherein the control target value of the evaporation temperature estimated by the controller is used to control the opening degree of the expansion valve.

2. The refrigeration cycle device according to claim 1, wherein the control target value of the evaporation temperature is limited by at least any of an upper limit value or a lower limit value.

3. The refrigeration cycle device according to claim 1, further comprising:
an outdoor unit having the compressor, a four-way valve, the first heat exchanger, an outdoor expansion valve and the evaporation temperature sensor which is installed on refrigerant piping between the first heat exchanger and the outdoor expansion valve; and
an indoor unit having the second heat exchanger, the expansion valve and the evaporation temperature sensor which is installed on refrigerant piping between the second heat exchanger and the expansion valve,
wherein the controller is programmed such that, when the indoor unit which has stopped operation restarts its operation, the control target value of the evaporation temperature before the operation is stopped is used to control the opening degree of the expansion valve of the heat exchanger serving as the evaporator.

4. A refrigeration cycle device, comprising:
a controller programmed to control operation of the refrigeration cycle device;
a compressor, a first heat exchanger serving as a condenser, an expansion valve, and a second heat exchanger serving as an evaporator connected in order through refrigerant piping to form a refrigeration cycle; and
an evaporation temperature sensor placed between the expansion valve and the second heat exchanger serving as the evaporator, wherein the opening degree of the expansion valve is controlled by the controller based on a difference between a temperature detected by the evaporation temperature sensor and a control target value of the evaporation temperature, wherein the temperature detected by the evaporation temperature sensor is an evaporation temperature between the expansion valve and the second heat exchanger serving as the evaporator, and the opening degree of the expansion valve is controlled by the controller such that the evaporation temperature detected by the evaporation temperature sensor reaches the control target value of the evaporation temperature; and
an outlet temperature sensor for detecting a temperature of a refrigerant on the outlet side of the second heat exchanger serving as the evaporator, wherein the control target value of the evaporation temperature is modified by the controller such that a temperature difference between the temperature detected by the outlet temperature sensor and the evaporation temperature detected by the evaporation temperature sensor reaches a predetermined value.

5. The refrigeration cycle device according to claim 4, wherein the control target value of the evaporation temperature is changed by the controller in accordance with a change in rotating speed of the compressor.

6. The refrigeration cycle device according to claim 4, wherein the control target value of the evaporation temperature is changed by the controller in accordance with a change in an air volume flowing into the second heat exchanger.

7. The refrigeration cycle device according to claim 4, wherein the control target value of the evaporation temperature is modified in a sequential manner.

8. The refrigeration cycle device according to claim 4, further comprising:
an outdoor unit including the compressor, a four-way valve, the first heat exchanger, an outdoor expansion valve, an outdoor evaporation temperature sensor and an outdoor outlet temperature sensor, the outdoor evaporation temperature sensor being installed on refrigerant piping between the first heat exchanger and the outdoor expansion valve, the outdoor outlet temperature sensor being installed on refrigerant piping on the opposite side of the first heat exchanger from the outdoor expansion valve; and
an indoor unit including the second heat exchanger, the expansion valve, the evaporation temperature sensor and the outlet temperature sensor, the evaporation temperature sensor being installed on refrigerant piping between the second heat exchanger and the expansion valve, the outlet temperature sensor being installed on refrigerant piping on the opposite side of the second heat exchanger form the expansion valve, wherein the indoor unit includes a plurality of indoor units that are connected in parallel and individually have target control values of evaporation temperatures for each indoor unit.

9. The refrigeration cycle device according to claim 8, wherein the controller is programmed such that, where, of a plurality of the indoor units, some of the indoor units are in operation and the other indoor unit is at standstill, when the indoor unit at standstill commences operation, the control target value of the evaporation temperature of the indoor unit which is continuously being operated is used to determine a control target value of an evaporation temperature in the indoor unit which commences operation.

10. The refrigeration cycle device according to claim 4, wherein the heat exchange serving as the condenser is a water heat exchanger, and the heat exchanger serving as the evaporator is an outdoor heat exchanger,
further comprising an evaporation temperature sensor between the expansion valve and the outdoor heat exchanger, wherein the opening degree of the expansion valve is controlled by the controller such that an evaporation temperature detected by the evaporation temperature sensor reaches a control target value of an evaporation temperature.

11. The refrigeration cycle device according to claim 10, further comprising an outlet temperature sensor for detecting a temperature of a refrigerant on the outlet side of the heat exchanger serving as the evaporator, wherein the control target value of the evaporation temperature is modified by the controller such that a temperature difference between the temperature detected by the outlet temperature sensor and the evaporation temperature detected by the evaporation temperature sensor reaches a predetermined value.

12. A refrigeration cycle device comprising:
a controller programmed to control operation of the refrigeration cycle device;
a compressor, a first heat exchanger serving as a condenser, an expansion valve, and a second heat exchanger serving as an evaporator connected in order through refrigerant piping to form a refrigeration cycle, and
an evaporation temperature sensor placed between the expansion valve and the second heat exchanger serving as the evaporator, wherein the opening degree of the expansion valve is controlled by the controller based on a temperature detected by the evaporation temperature sensor,
wherein the controller is programmed to control the opening degree of the expansion valve such that an evaporation temperature detected by the evaporation temperature sensor reaches a control target value of an evaporation temperature, and additionally, is programmed to control the discharge temperature of the compressor to reach the target value, wherein the controller performs switching control to select the evaporation temperature control function for operation in a low load range, and select the discharge temperature control function for operation in a high load range.

13. A refrigeration cycle device, comprising:
a controller programmed to control operation of the refrigeration cycle device;
a compressor, a first heat exchanger serving as a condenser, an expansion valve, and a second heat exchanger serving as an evaporator connected in order through refrigerant piping to form a refrigeration cycle; and
an evaporation temperature sensor placed between the expansion valve and the second heat exchanger serving as the evaporator, wherein the opening degree of the expansion valve is controlled by the controller based on a difference between a temperature detected by the evaporation temperature sensor and a control target value of the evaporation temperature, wherein the temperature detected by the evaporation temperature sensor is an evaporation temperature between the expansion valve and the second heat exchanger serving as the evaporator, and the opening degree of the expansion valve is controlled by the controller such that the evaporation temperature detected by the evaporation temperature sensor reaches the control target value of the evaporation temperature;
an outdoor unit including the compressor, a four-way valve, the first heat exchanger and an outdoor expansion valve; and
an indoor unit including the second heat exchanger, wherein
the outdoor unit includes a suction temperature sensor installed on refrigerant piping on the suction side of the compressor, and evaporation temperature sensors installed on refrigerant piping on both sides of the outdoor expansion valve, and
the control target value of the evaporation temperature is modified such that a temperature difference between a temperature detected by the suction temperature sensor and an evaporation temperature detected by the evaporation temperature sensor reaches a predetermined value.

* * * * *